(12) United States Patent
Jia et al.

(10) Patent No.: US 10,867,407 B2
(45) Date of Patent: Dec. 15, 2020

(54) SYSTEM AND METHODS FOR EXTRINSIC CALIBRATION OF CAMERAS AND DIFFRACTIVE OPTICAL ELEMENTS

(71) Applicant: Magic Leap, Inc., Plantation, FL (US)

(72) Inventors: Zhiheng Jia, Weston, FL (US); Etienne Gregoire Grossmann, Menlo Park, CA (US); Hao Zheng, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 136 days.

(21) Appl. No.: 16/189,943

(22) Filed: Nov. 13, 2018

(65) Prior Publication Data

US 2019/0147625 A1  May 16, 2019

Related U.S. Application Data

(60) Provisional application No. 62/586,691, filed on Nov. 15, 2017, provisional application No. 62/588,239, filed on Nov. 17, 2017.

(51) Int. Cl.
*G06T 7/80* (2017.01)
*H04N 5/247* (2006.01)
(Continued)

(52) U.S. Cl.
CPC ............... *G06T 7/80* (2017.01); *H04N 5/247* (2013.01); *H04N 17/002* (2013.01); *G06T 7/70* (2017.01); *G06T 2207/30244* (2013.01)

(58) Field of Classification Search
CPC .. H04N 13/344; H04N 13/327; H04N 13/239; H04N 13/246; H04N 17/002;
(Continued)

(56) References Cited

U.S. PATENT DOCUMENTS 9,827,209 B2 * 11/2017 Kostamo ............. G02B 5/1857
10,466,360 B1 * 11/2019 Bardagjy ................ G06T 7/521
(Continued)

OTHER PUBLICATIONS

Bauer, et al., "Geometrical Camera Calibration with Diffractive Optical Elements", Optics Express 20241, Dec. 8, 2008, vol. 16., No. 25, © Optical Society of America, Dec. 8, 2008, 8 pages.
(Continued)

*Primary Examiner* — Ross Varndell
(74) *Attorney, Agent, or Firm* — Kilpatrick Townsend & Stockton LLP

(57) ABSTRACT

Multiple cameras are coupled to a camera rig. Multiple diffractive optical elements (DOEs) are coupled to a DOE prop. Each camera is positioned in an eye box of a DOE and takes an image when the cameras are positioned at a first position, a second position and a third position relative to the DOEs. Three images taken by a each camera at each one of the first position, the second position and third position. The images are transmitted to a processor coupled to the camera rig. For each image, the processor identifies data pairs, each data pair including pixel coordinates of an intensity peak in
(Continued)

the image and virtual light source produced by the diffractive optical element that corresponds to the intensity peak, and determines extrinsic parameters of the cameras using the identified data pairs for each image.

26 Claims, 8 Drawing Sheets

(51) Int. Cl.
*H04N 17/00* (2006.01)
*G06T 7/70* (2017.01)

(58) Field of Classification Search
CPC .. H04N 13/128; H04N 13/156; H04N 13/254; H04N 13/275; H04N 13/286; H04N 13/373; H04N 13/376; H04N 13/38; H04N 13/383; H04N 13/395; H04N 13/398; G02B 27/017; G02B 2027/0178; G02B 2027/0138; G02B 27/0172; G02B 2027/014; G02B 27/0093; G02B 2027/011; G02B 27/01; G02B 30/34; G06T 19/006; G06T 7/80; G06T 2207/30208; G06T 15/20; G06T 2207/10012; G06T 2207/10052; G06T 3/20; G06T 3/40; G06T 3/60; G06T 7/521

See application file for complete search history.

(56) References Cited

U.S. PATENT DOCUMENTS

| | | | |
|---|---|---|---|
| 2006/0082882 A1* | 4/2006 | Wang | G02B 5/1895 |
| | | | 359/558 |
| 2008/0212838 A1 | 9/2008 | Frigerio | |
| 2013/0314668 A1 | 11/2013 | Haddadi et al. | |
| 2015/0212488 A1* | 7/2015 | Rosen | G03H 1/0443 |
| | | | 1/443 |
| 2015/0235460 A1* | 8/2015 | Schowengerdt | G02B 5/20 |
| | | | 345/633 |
| 2016/0012643 A1* | 1/2016 | Kezele | G02B 27/017 |
| | | | 345/633 |
| 2016/0073091 A1 | 3/2016 | Hillebrand et al. | |
| 2016/0119541 A1 | 4/2016 | Alvarado-Moya et al. | |
| 2016/0189387 A1 | 6/2016 | Kannan et al. | |
| 2017/0098305 A1* | 4/2017 | Gossow | G06T 7/80 |
| 2017/0122725 A1* | 5/2017 | Yeoh | H04N 13/344 |
| 2019/0249984 A1* | 8/2019 | Barlev | G01B 11/25 |

OTHER PUBLICATIONS

PCT/US2018/060833, "International Search Report and Written Opinion", dated Feb. 1, 2019, 11 pages.

R. I. Hartley et al., "Multiple View Geometry in Computer Vision", Cambridge University Press, ISBN: 0521540518, second edition, 2004, 673 pages.

* cited by examiner

SYSTEM AND METHODS FOR EXTRINSIC CALIBRATION OF CAMERAS AND DIFFRACTIVE OPTICAL ELEMENTS

CROSS-REFERENCE TO RELATED APPLICATIONS

This application claims priority to U.S. Provisional Patent Application No. 62/586,691, filed on Nov. 15, 2017, entitled "SYSTEM AND METHODS FOR EXTRINSIC CALIBRATION OF CAMERAS AND DIFFRACTIVE OPTICAL ELEMENTS," and U.S. Provisional Patent Application No. 62/588,239, filed on Nov. 17, 2017, entitled "SYSTEM AND METHODS FOR EXTRINSIC CALIBRATION OF CAMERAS AND DIFFRACTIVE OPTICAL ELEMENTS," the disclosures of which are hereby incorporated by reference in their entirety for all purposes.

BACKGROUND OF THE INVENTION

Modern computing and display technologies have facilitated the development of systems for so-called "virtual reality" or "augmented reality" experiences, wherein digitally produced images or portions thereof are presented in a wearable device to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in AR and VR systems, there is a need in the art for improved methods and systems related to camera calibration in the context of AR and VR systems.

SUMMARY OF THE INVENTION

Embodiments of the present invention relate generally to extrinsic calibration of multiple cameras either simultaneously or concurrently with or subsequently to the intrinsic calibration of the cameras. A plurality of diffractive optical elements (DOEs) may be used for the extrinsic and/or intrinsic calibration of the cameras. In some embodiments, extrinsic parameters of the DOEs may also be determined along with the extrinsic parameters of the cameras.

Various embodiments provide a system for determining extrinsic parameters of a plurality of cameras. The system includes a plurality of diffractive optical elements, a plurality of cameras and a processor coupled to the plurality of cameras to receive image data from the plurality of cameras. The plurality of cameras may be coupled to a first support system including at least one support beam. The plurality of diffractive optical elements may be coupled to a support system including at least one support beam. Each one of the plurality of cameras is positioned in an eye box of each one of the plurality of diffractive optical elements when the plurality of cameras are positioned at a first position, a second position and a third position relative to the plurality of diffractive optical elements. Each one of the plurality of cameras takes one image when positioned at each one of the first position, the second position and the third position. The plurality of images include at least three images taken by each camera, each image corresponding to one of the first position, second position and the third position. The processor stores executable instructions that, when executed by the processor, cause the processor to: receive a plurality of images from the plurality of cameras, for each image, identify data pairs, each data pair including pixel coordinates of an intensity peak in the image and virtual light source produced by the diffractive optical element that corresponds to the intensity peak, and determine extrinsic parameters of the plurality of cameras using the identified data pairs for each image. The processor may further store executable instructions that, when executed by the processor, cause the processor to determine extrinsic parameters of the plurality of diffractive optical elements using the identified data pairs for each image at each one of the first position, the second position and the third position.

In some embodiments, the processor may further store executable instructions that, when executed by the processor, cause the processor to determine intrinsic parameters of the plurality of cameras simultaneously or concurrently with determining the extrinsic parameters of the plurality of cameras. The intrinsic parameters include one or more of a focal length, a principal point and distortion coefficient(s) of a camera.

Some embodiments provide a method for determining extrinsic parameters of a plurality of cameras. A plurality of diffractive optical elements are provided. A plurality of cameras are positioned in an eye box of each one of the plurality of diffractive optical elements when the plurality of cameras are positioned at a first position, a second position and a third position relative to the plurality of diffractive optical elements. A plurality of images are received from the plurality of cameras. Each one of the plurality of cameras takes one image when positioned at each one of the first position, the second position and the third position. The plurality of images include at least three images taken by each camera, each image corresponding to one of the first position, second position and the third position. For each image, data pairs are identified. Each data pair includes pixel coordinates of an intensity peak in the image and virtual light source produced by the diffractive optical element that corresponds to the intensity peak. Extrinsic parameters of the plurality of cameras are determined using the identified data pairs for each image. The method may also include determining extrinsic parameters of the plurality of diffractive optical elements using the identified data pairs for each image at each one of the first position, the second position and the third position.

In some embodiments, the method may also include determining intrinsic parameters of the plurality of cameras simultaneously or concurrently with determining the extrinsic parameters of the plurality of cameras. The intrinsic parameters include one or more of a focal length, a principal point and distortion coefficient(s) of a camera.

Various embodiments provide a method of determining extrinsic parameters of a plurality of cameras using a plurality of diffractive optical elements. A plurality of diffractive optical elements are provided. A plurality of cameras are positioned in an eye box of each one of the plurality of diffractive optical elements. A plurality of images are received from the plurality of cameras such that a single image is received from each one of the plurality of cameras at a given position of the camera with respect to one of the plurality of diffractive optical elements. For each image, data pairs are identified. Each data pair includes pixel coordinates of an intensity peak in the image and virtual light source produced by the diffractive optical element that corresponds to the intensity peak. Extrinsic parameters of the plurality of cameras are determined using the identified data pairs and a predetermined transform matrix of the plurality of diffractive optical elements. In some embodiments, the method may also include determining a cost function including a sum of at least a subset of the data pairs, and optimizing the cost function to determine a first transformation matrix for each one of the plurality of cameras. The first transformation matrix maps a coordinate system of a given camera to a coordinate system of a corresponding diffractive optical element. The extrinsic parameters are determined using the first transformation matrix.

Various embodiments provide a system for determining extrinsic parameters of a plurality of cameras using a plurality of diffractive optical elements. The system includes a plurality of diffractive optical elements, a plurality of cameras and a processor coupled to the plurality of cameras to receive image data from the plurality of cameras. The plurality of cameras may be coupled to a first support system including at least one support beam. The plurality of diffractive optical elements may be coupled to a support system including at least one support beam. Each one of the plurality of cameras is positioned in an eye box of each one of the plurality of diffractive optical elements. The processor stores executable instructions that, when executed by the processor, cause the processor to: receive a plurality of images from the plurality of cameras such that a single image is received from each one of the plurality of cameras at a given position of the camera with respect to one of the plurality of diffractive optical elements; identify data pairs for each image. Each data pair includes pixel coordinates of an intensity peak in the image and virtual light source produced by the diffractive optical element that corresponds to the intensity peak. The executable instructions, when executed by the processor, further cause the processor to determine extrinsic parameters of the plurality of cameras using the identified data pairs and a predetermined transform matrix of the plurality of diffractive optical elements. In some embodiments, the executable instructions, when executed by the processor, further cause the processor to determine a cost function including a sum of at least a subset of the data pairs, and optimize the cost function to determine a first transformation matrix for each one of the plurality of cameras. The first transformation matrix maps a coordinate system of a given camera to a coordinate system of a corresponding diffractive optical element. The extrinsic parameters are determined using the first transformation matrix.

Additional features, benefits, and embodiments are described below in the detailed description, figures, and claims.

DETAILED DESCRIPTION OF SPECIFIC EMBODIMENTS

Figure 1:
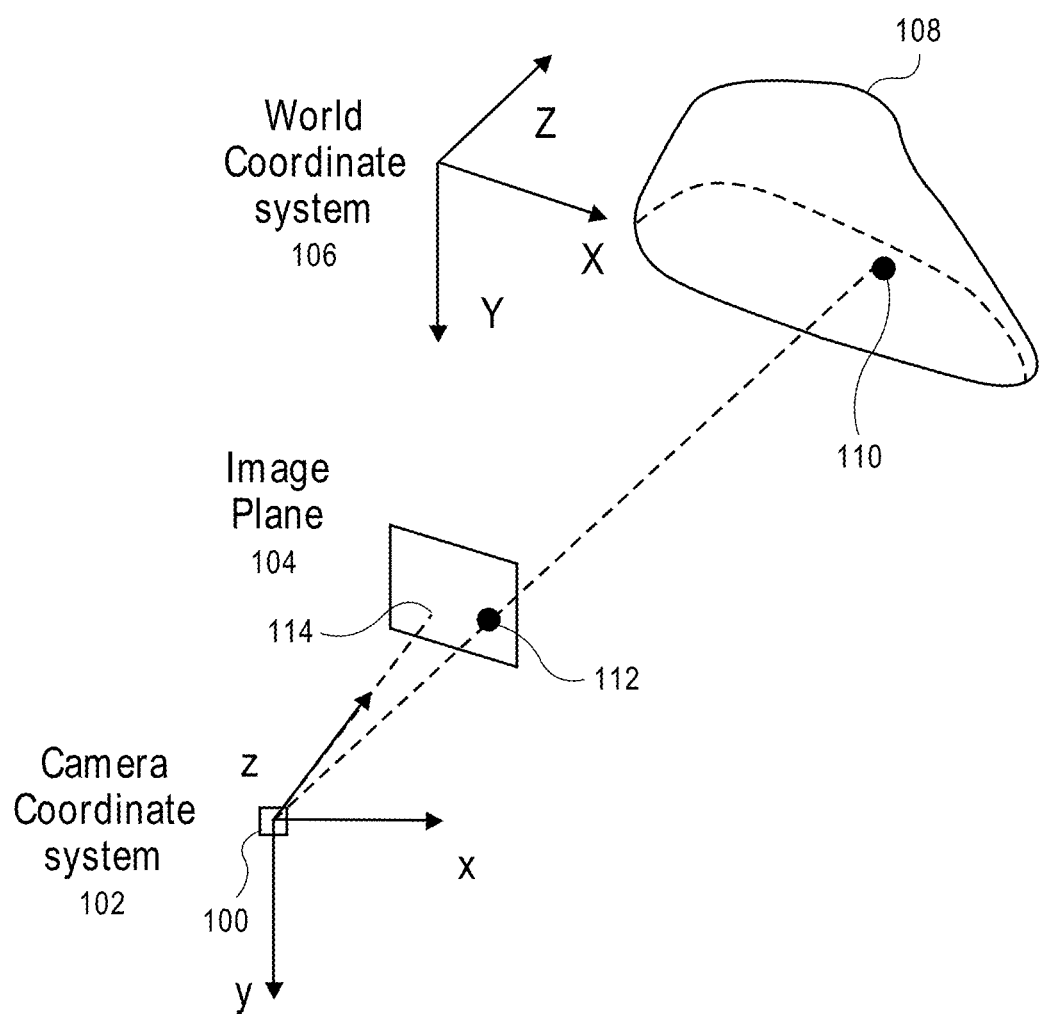
FIG. 1 illustrates camera coordinate systems and world coordinate systems according to exemplary embodiments of the present invention.

Embodiments of the present invention are directed to image display systems and methods for multi-camera calibration. More specifically, embodiments of the present invention are directed to determining extrinsic parameters of multiple cameras using diffractive optical elements (DOEs). A DOE is an optical element that generates, from an input light source, a pattern of beams of light. The direction of each beam of light is known for a given DOE. In some embodiments, the intrinsic parameters of the cameras may also be determined prior to or simultaneously or concurrently with the extrinsic parameters of the cameras. In yet other embodiments, the extrinsic parameters of the DOEs may also be determined along with the extrinsic parameters of the cameras.

According to embodiments of the present invention, a wearable device may include augmented and/or virtual reality glasses. A camera may be coupled to the glasses. In order to view the actual location of a real-world object on the augmented and/or virtual reality glasses, the camera needs to be calibrated. Calibrating a camera may include determining intrinsic and/or extrinsic parameters of the camera. The intrinsic parameters represent a projective transformation from the 3-D camera's coordinates into the 2-D image coordinates. The intrinsic parameters may include the focal length ($f_x$, $f_y$), the principal point and the distortion coefficient(s). On the other hand, the extrinsic parameters represent a transformation from a first coordinate system to a second coordinate system. According to various embodiments, extrinsic parameters of a camera rig may refer to the coordinate transforms from the system of coordinates of one camera to the system of coordinates of another camera in the camera rig. According to various embodiments, extrinsic parameters of a DOE prop may refer to the coordinate transforms from the system of coordinates of one DOE to the system of coordinates of another DOE in the DOE prop. In some embodiments, extrinsic parameters may refer to the transforms from a world referential to a camera referential, or from a camera referential to a DOE referential. The extrinsic parameters include a rotation matrix and a translation vector. The extrinsic parameters may help to determine the position of the camera center and the camera's heading in world coordinates.

Accordingly, the camera calibration may estimate the parameters of a lens and image sensor of a camera. The determined parameters may be used to correct for lens distortion, measure the size of an object in world units, or determine the location of the camera in a scene in a 3-D scene reconstruction.

Conventional systems allow for determining the intrinsic parameters of a given camera. Some conventional calibration techniques use checkerboard approach that requires the camera to capture multiple images (e.g. 100+ images) of a checkerboard that is moved with respect to the camera between each image. The acquired images are then processed to determine the intrinsic parameters of the camera. The calibration is accomplished by determining the location of a portion of the checkerboard (e.g. corners of the checkerboard) on each image and correlating the coordinates of that point with the location of the camera. However, for systems such as robotics systems, automobiles, airborne vehicles, underwater and surface vessels, surveillance systems, multiple cameras may be used. For systems where multiple cameras are needed, each camera must be individually intrinsically calibrated, which is time consuming and cumbersome.

FIG. 1 illustrates camera coordinate systems and world coordinate systems according to exemplary embodiments of the present invention. A real world object 108 is being imaged using a camera 100 provided at the center of the camera coordinate system 102. The camera 100 maps the 3D points of the real world object 108 to 2D points on the image plane 104. The position of the object 108 is defined using the world coordinate system 106. Using the camera 100, an image of the object 108 is formed on an image plane 104. For example, an image point 112 on the image plane corresponds to a point 110 of the object 108. The camera coordinate system 102 may be related to the world coordinate system 106 by a rotation (represented by a rotation matrix) and a translation (represented by a translation vector).

The camera-centric coordinates of a 3D point may be illustrated as $_C A=(x, y, z)$. The 2D pixel coordinates may be illustrated with $_p U=(u, v)$. A 3D point may be mapped to the 2D pixel coordinates as $_p U=f(_C A, \Theta)$, where $f(\ )$ is the projection function, and $\Theta$ is a vector of "intrinsic parameters" that describe the optical properties of the camera. For example, $\Theta$ could hold the focal lengths and principal point of the camera. For example, $\Theta=f_x, f_y, c_x, c_y$, where $f_x$ and $f_y$ are the x- and y-focal lengths of the camera, and $(c_x, c_y)$ is the principal point of the camera. The focal lengths and the principal points may be measured in pixels. The projection function may then be expressed as:

$$u_x = \frac{f_x x}{z} + c_x$$
$$u_y = \frac{f_y y}{z} + c_y$$

According to some embodiments, lens distortion may also be modeled using the projection function.

It may be necessary to calibrate the camera 100 to achieve accurate reconstruction of a real world object and/or model in a virtual reality (VR)/augmented reality (AR) representation. Camera calibration may include determining certain parameters associated with the camera and/or the imaging system. For example, camera calibration may include determining one or more of intrinsic parameters of the camera, extrinsic parameters of the camera, and extrinsic parameters of the DOEs (where applicable).

As provided above, the extrinsic parameters may represent a transformation from the world coordinate system 106 to the camera coordinate system 102. The extrinsic parameters include the rotation matrix and the translation vector.

The extrinsic parameters may help to determine the position of the camera center 100 and the camera's heading in the world coordinate system 106.

As provided above, the intrinsic parameters may represent a projective transformation from the camera coordinate system 102 into the 2-D image coordinates on the image plane 104. The intrinsic parameters include the focal length $(f_x, f_y)$, the principal point and the distortion coefficient. The focal length refers to the distance between the center of the camera coordinate system 102 and the image plane 104. The principal point 114 is where principal axis (i.e. the z-axis of the camera coordinate system 102) intersects the image plane 104. The distortion coefficient may be a coefficient associated with a particular camera that is used to correct the distortion introduced by the lens of the particular camera. Conventional systems use predefined calibration grids (e.g. known 3D calibration target objects such as checkerboard objects) for intrinsic camera calibration. Several observations with different orientations are needed to estimate the parameters of a single camera.

A DOE may include a laser and a grating. When the laser is turned on, the laser may create a set of virtual lights (referred as "virtual light sources") at known positions. The virtual light sources created by a DOE may be seen by an observer located (and properly oriented) within a region of space called the "eye box of the DOE."

In a digital image produced by a camera, each virtual light source may be identifiable as a local maximum of gray levels. An image may be automatically processed to compute a list of the local maxima. The notation $_p U'_1, \ldots, _p U'_N$ may be used to illustrate a list of images of projections of virtual light sources in an image. Each $_p U'_i$ is a two-dimensional vector consisting of the x-coordinate and the y-coordinate of a point in an image. The two-dimensional vectors may be referred as intensity peaks.

The 3D position of a virtual light source $_D A$ may be represented by a vector of four homogeneous coordinates $_D A=(x, y, z, t)$. Accordingly, a virtual light source at a finite distance may be uniquely represented by a vector $_D A=(x, y, z, 1)$, while a virtual light source at infinity may be uniquely represented by a vector $_D A=(x, y, z, 0)$. The coordinates for the vector DA are written in a "display system of coordinates". When creating a DOE, the positions of the virtual light sources may be selected according to, for example, the particular implementation. Thus, an exemplary DOE creates a set of N virtual light sources $_D A_1, \ldots, _D A_N$ with known coordinates in a referential coordinate system attached to the DOE. In particular, one virtual light source, referred as "zeroth-order light source", corresponds to direct transmission of the laser through the grating. The zeroth-order virtual light source is brighter than the other light sources.

A DOE is typically created by etching a microscopic grating onto a solid surface such as a silicon crystal. When manufacturing a DOE, a macroscopically visible pattern may be etched, for example, for the purpose of visually identifying the X-axis of the DOE system of coordinates. On some DOEs, the X and Y-axes may be interchanged. Such DOEs may be referred as "symmetric DOEs" as they are designed to be symmetric around the two planes that contain the origin of DOE coordinates D (0, 0, 0) and have respective normals D (1, 0, 0) and D (0, 1, 0). Consequently, the set of virtual light sources of the symmetric DOEs is invariant by rotations of 90, 180 and 270 degrees around the Z-axis.

If a virtual light source has coordinates $_D A$ in a DOE coordinate system, then it has coordinates $cT_D \cdot _D A$ in a camera coordinate system, where $cT_D$ is the 4×4 matrix that transforms coordinates from the DOE system of coordinates to the camera system of coordinates. The transform may be accomplished by decomposing a 4×4 rigid transform $cT_D$ into a 3×3 rotation matrix $_cR_T$ and a 3×1 translation vector $_ct_D$. The rotation $_cR_T$ is commonly called the orientation of the DOE with respect to the camera.

A camera may be placed to have its entrance pupil entirely contained in the eye-box of the DOE, and to be oriented so that the camera forms an image of the virtual light sources of the DOE. The orientation of the DOE may also be approximately known. For example, the camera and DOE may be placed to have the X-axis of the camera system of coordinates is substantially parallel to the and the X-axis of the DOE systems of coordinates.

If $_DA_1$ is the zeroth-order virtual light source, the brightest intensity peak $_pU'_i$ may be identified among the intensity peaks $_pU'_1, \ldots, _pU'_N$ of an image. The brightest intensity peak may be assigned $_pU_1:=_pU'_i$. From this zeroth-order intensity peak, each intensity peak $_pU'_i$ corresponding to every virtual light source $_DA_i$ may be identified.

Figure 2:
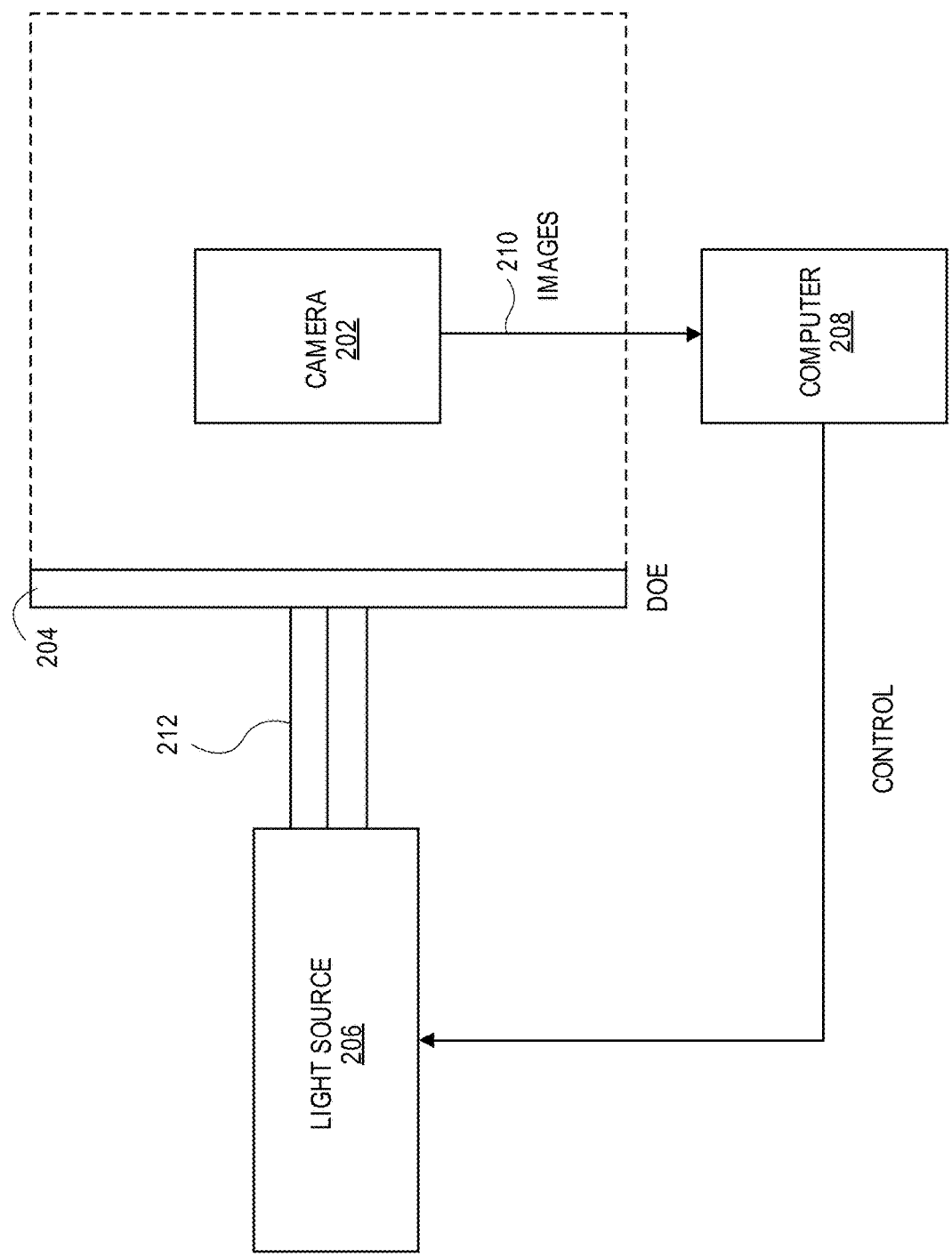
FIG. 2 illustrates an exemplary system for intrinsic calibration of a camera according to some embodiments of the present invention.

FIG. 2 illustrates an exemplary system for intrinsic calibration of a camera. A DOE 204 is provided between a light source 206 (e.g. a collimated light source) and the camera 202. According to various embodiments, the light source 206 may include a laser. The DOE 204 is used to create a pattern of virtual light sources from an input light source, such as collimated laser beam 212, which is then captured as an image by the camera 202. The camera 202 may transmit the captured images 210 (or the images may be retrieved from the camera 202) to an image processing server computer 208

Figure 3:
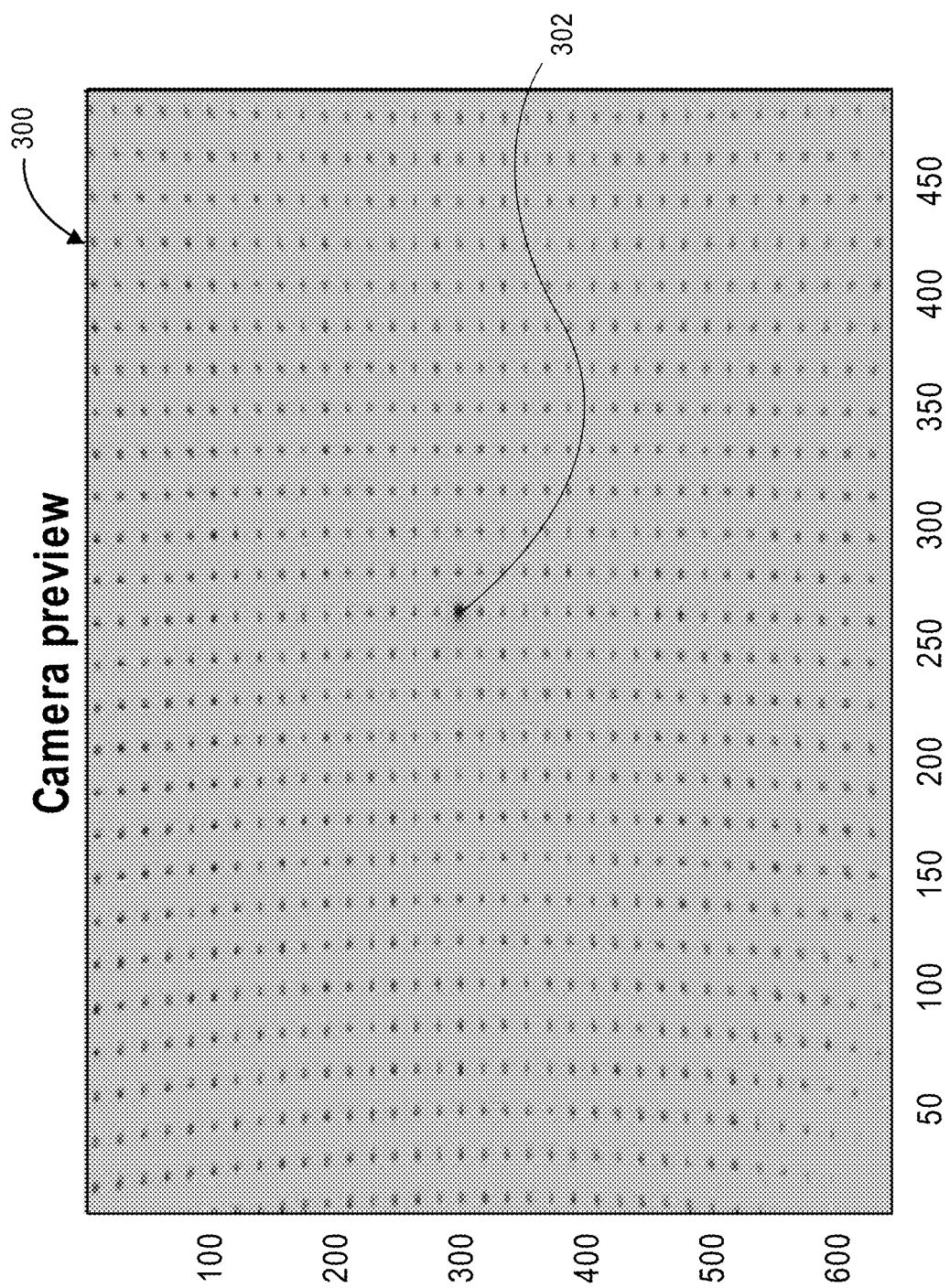
FIG. 3 illustrates an exemplary imaged pattern of virtual light sources as captured by a camera according to some embodiments of the present invention.

FIG. 3 illustrates an exemplary imaged pattern 300 of virtual light sources as captured by the camera 202. Upon receipt, the image processing server computer 208 may determine the coordinates of the brightest intensity peak 302 on the imaged pattern 300. The image processing server computer 208 then determines the virtual light source produced by the DOE 204 that corresponds to the identified brightest intensity peak 302. The image processing server computer 208 continues identifying the pairs of the intensity peaks on the imaged pattern 300 and the corresponding virtual light sources produced by the DOE 204 by moving in predetermined distances from the originally identified brightest intensity peak 302. The same process is completed for each of the acquired images to determine the intrinsic parameters of the camera.

Embodiments of the inventive system and methods disclosed herein determine the extrinsic parameters (as well as the intrinsic parameters) of two or more cameras using DOEs. In addition to the extrinsic and/or intrinsic parameters of the cameras, some embodiments also determine the extrinsic parameters of the DOEs thereby eliminating the need to use DOEs with predetermined extrinsic parameters.

Figure 4:
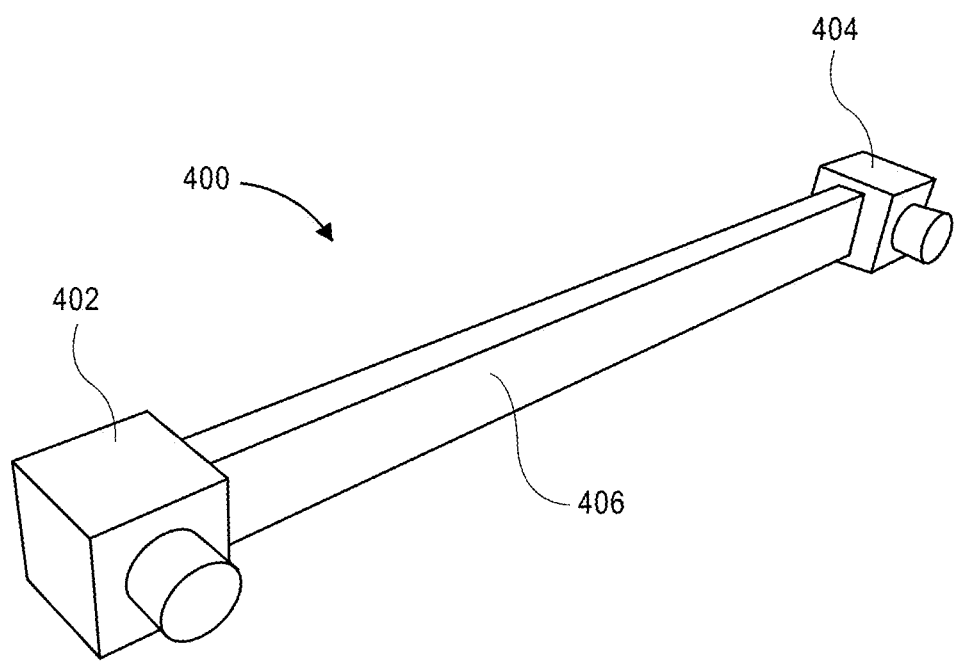
FIG. 4 is a simplified schematic diagram illustrating a diffractive optical element (DOE) prop according to some embodiments of the present invention.
Figure 5:
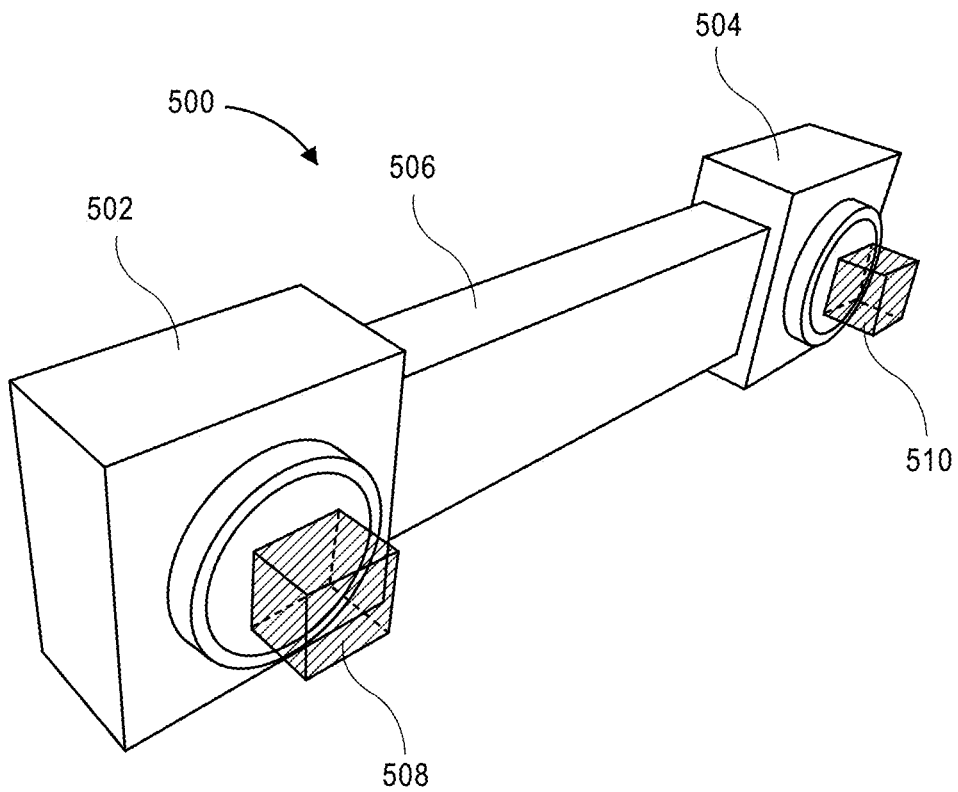
FIG. 5 is a simplified schematic diagram illustrating a camera rig according to some embodiments of the present invention.

Embodiments are directed to a camera rig 400 and a DOE prop 500 positioned relative to each other. As illustrated in FIG. 4, in some embodiments the camera rig 400 includes a first camera 402 and a second camera 404 attached to a first support system. In some embodiments, the first camera 402 and the second camera 404 may be rigidly attached to the support system. The first support system may include a support beam 406, and the camera rig 400 may include the first camera 402 and the second camera 404 attached at opposing ends of the support beam 406. As illustrated in FIG. 5, the DOE prop 500 includes a first DOE 502 and a second DOE 504 attached to a second support system. The second support system may include a support beam 506, and the DOE prop 500 may include the first DOE 502 and the second DOE 504 attached at opposing ends of the support beam 506. The first eye box 508 and the second eye box 510 provided in front of the first DOE 502 and the second DOE 504, respectively, are virtual (i.e. not physical) boxes that represent a volume of space within which a lens system or visual display forms an effectively viewable image. That is, light produced by the first DOE 502 and the second DOE 504 is viewable when the viewer (e.g. the camera) is positioned within the respective eye box (e.g. the first eye box 508 and the second eye box 510). When the DOEs in the prop are placed so that all cameras in the camera rig are placed the eye-box of one of the DOEs, the camera rig may be said to fit in the DOE prop.

One of ordinary skill in the art will appreciate that the number of cameras and the number of DOEs are not limited to the illustrative examples shown in the figures of the present application. Any number of cameras and DOEs may be used in connection with embodiments of the present invention. As many cameras and the same number of DOEs may be used and simultaneously or concurrently calibrated according to various embodiments of the present invention.

Figure 6:
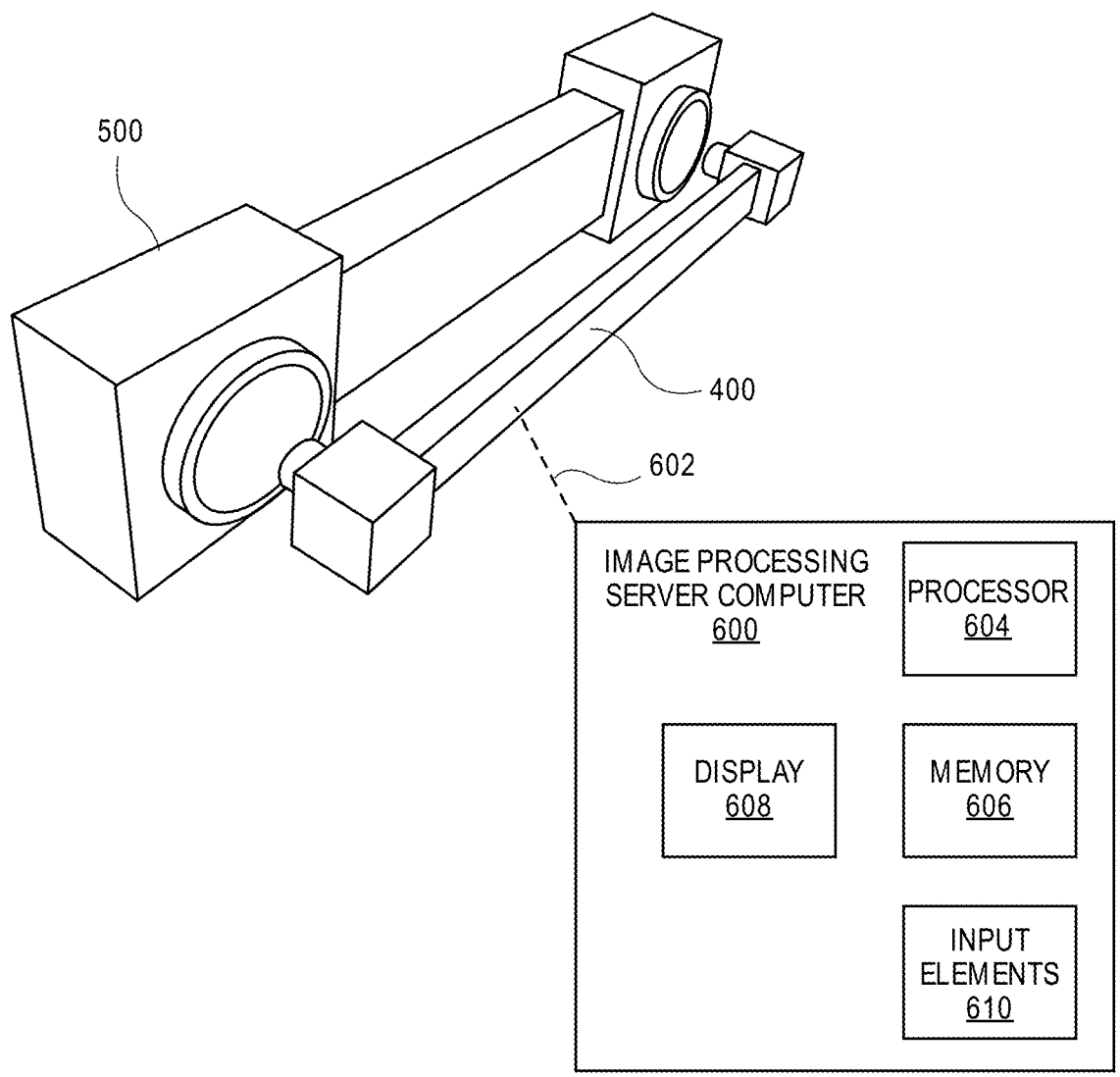
FIG. 6 is a simplified schematic diagram illustrating a system for extrinsic calibration of multiple cameras according to some embodiments of the present invention.

As illustrated in FIG. 6, the camera rig 400 is positioned across from the DOE prop 500 such that the first camera 402 is positioned within the first eye box 508 of the first DOE 502 and second camera 404 is positioned within the second eye box 510 of the second DOE 504. FIG. 6 illustrates a camera rig 400 with two cameras and a DOE prop 500 with two DOEs, however the invention is not limited to two cameras and two DOEs.

When the DOEs are turned on, each DOE produces a pattern of virtual light sources at a finite distance (when DOEs are finite-distance DOEs) or at infinity (when DOEs are infinite-distance DOEs). Each camera takes a single image of the pattern of virtual light sources produced by a corresponding DOE when the camera is positioned at a given position with respect to the DOE. Embodiments of the present invention may determine the extrinsic parameters of the plurality of cameras using at least three images taken by each camera at different positions having at least a change in rotation axis as to each position change. The plurality of cameras are positioned at a first position, a second position and a third position relative to the DOEs such that three images are taken by a first camera at each one of the first position, the second position and the third position, and three images are taken by a second camera at each one of the first position, the second position and the third position.

One of ordinary skill in the art will appreciate that the number of positions may be different and the systems and methods described herein may work with any number of positions (equal or greater than 3). For example, the systems and methods may include K cameras and P positions, resulting in K*P images being processed. The camera rig 400 may be coupled (via a wired or wireless connection 602) to an image processing server computer 600. The cameras coupled to the camera rig 400 may transmit the acquired images to the image processing server computer 600 via the wired or wireless connection 602. The image processing server computer 600 may include a processor 604, a memory 606, a display 608 and input elements 610 (including but not limited to a touch screen, a keyboard, a mouse, etc.). The processor 604 can be implemented as one or more integrated circuits (e.g., one or more single core or multicore microprocessors and/or microcontrollers), and is used to control the processing of images received from the cameras. The processor 604 can execute a variety of programs in response to program code or computer-readable code stored in the system memory 606, and can maintain multiple concurrently executing programs or processes.

The system memory 606 can be implemented using any combination of any number of non-volatile memories (e.g., flash memory) and volatile memories (e.g., DRAM, SRAM), or any other non-transitory storage medium, or a combination thereof media. System memory 606 may store an operating system (OS) and computer code, executable by the processor 604, for performing any of the functions described herein.

Upon receiving the images, the image processing server computer 600 identifies data pairs for each image. Each data pair includes pixel coordinates of an intensity peak in the image and virtual light source produced by the DOE that corresponds to the intensity peak. The image processing server computer 600 determines the extrinsic parameters of the cameras using the identified data pairs for each image. The extrinsic parameters include the rigid transform that maps coordinates in the system of coordinates of a first camera (e.g. the first camera 402) into coordinates in the system of coordinates of another camera (e.g. the second camera 404). The rigid transforms may be represented using matrices (e.g. a 4×4 matrix). According to various embodiments, the rigid transform from the system of coordinates of a first camera to the system of coordinates of another camera is constant during the execution of the method described herein. An exemplary 4×4 matrix referred as a $_{c1}T_{c2}$ which denotes the transformation matrix (e.g. T) that maps coordinates in the system of coordinates of the second camera 404 (e.g. c2) into the system of coordinates of the first camera 402 (e.g. c1).

According to various embodiments, an exemplary 4×4 rigid transform $_{c1}T_{c2}$ may be decomposed into a 3×3 rotation matrix $_{c1}R_{c2}$ and a 3×1 translation vector $_{c1}t_{c2}$. A calibrated camera rig is one for which the transform $_{c1}T_{c2}$ and all other transforms $_{ci}T_{cj}$ between pairs of cameras in the camera rig are known. In order to know all the transforms $_{ci}T_{cj}$, i, j∈1 ... K of a K-camera rig, it is sufficient to know the K−1 transforms $_{c1}T_{ci}$, for i∈2 ... K. The set of rigid transforms $_{c1}T_{ci}$, for i∈2 ... K, is referred as the extrinsic calibration of the considered camera rig.

According to various embodiments, the image processing server computer 600 may also determine the extrinsic parameters of the DOEs using the identified data pairs for each image at each one of the first position, the second position and the third position. The extrinsic calibration of the DOEs coupled to the DOE prop 500 includes determining the rigid transform that maps coordinates in the system of coordinates of a first DOE (e.g. the first DOE 502) into coordinates in the system of coordinates of another DOE (e.g. the second DOE 504). The rigid transforms may be represented using matrices (e.g. a 4×4 matrix). According to various embodiments, the rigid transform from the system of coordinates of a first DOE to the system of coordinates of another DOE is constant during the execution of the method described herein. An exemplary 4×4 matrix referred as $_{p1}T_{p2}$ which denotes the transformation matrix (e.g. T) that maps coordinates in the system of coordinates of the second DOE 504 (e.g. p2) into the system of coordinates of the first DOE 502 (e.g. p1). A calibrated DOE prop is one for which the transform $_{p1}T_{p2}$ and all other transforms $_{pi}T_{pj}$ between pairs of DOEs in the DOE prop are known.

In some embodiments, extrinsic parameters of a camera rig may be used to run many multi-view computer vision algorithms. For example, extrinsic parameters of a camera rig may be used to perform 3D reconstruction of a scene from images taken by a stereo rig.

Embodiments may include two types of DOEs: a finite-distance DOEs that show a pattern at a finite distance, and infinite-distance DOEs that show a pattern at an infinite distance. The rigid transform between two finite-distance DOEs is defined by a rotation matrix and a translation vector. In some embodiments, the rigid transform between two finite-distance DOEs may be defined entirely by the rotation matrix and the translation vector. The rigid transform between an infinite-distance DOE and a finite-distance DOE is characterized by a rotation matrix only. In addition, the rigid transform between an infinite-distance DOE and a camera is defined by a rotation matrix only.

As used herein, $_{ck}X=(_{ck}x, _{ck}y, _{ck}z)$ denotes the coordinates of a 3D point in the system of coordinates of camera number k (mnemo-technique: "c" for "camera"). A 3D point $_{ck}X$ projects to a pixel location in the image of camera number k.

As used herein, $f(_{ck}X, \Theta_k)$ denotes the pixel coordinates of the projected point $_{ck}X$, where $\Theta_k$ are the intrinsic parameters of camera number k. When the intrinsic parameters of a camera are known, i.e. when the calibration of the camera is known, $\Theta_k$ may be omitted from the notation resulting in $f(_{ck}X)$ to denote the pixel coordinates of the projected point $_{ck}X$.

Determining the Extrinsic Parameters of the Cameras and the Extrinsic Parameters of DOEs According to some embodiments, the extrinsic parameters of the DOE prop and the camera rig may be determined substantially simultaneously or concurrently. In such embodiments, there are no known transform matrices. The method includes capturing three or more images with two or more cameras when the camera rig and the DOE prop are in different positions relative to each other.

Figure 7A:
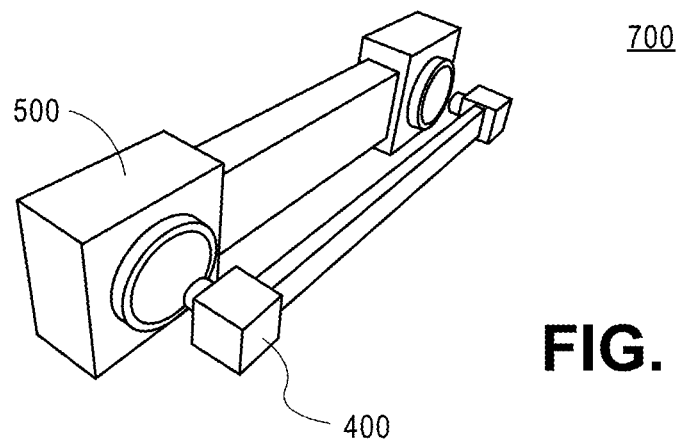
FIGS. 7A-7C illustrate three different relative position of the camera rig and the DOE prop according to some embodiments of the present invention.
Figure 7B:
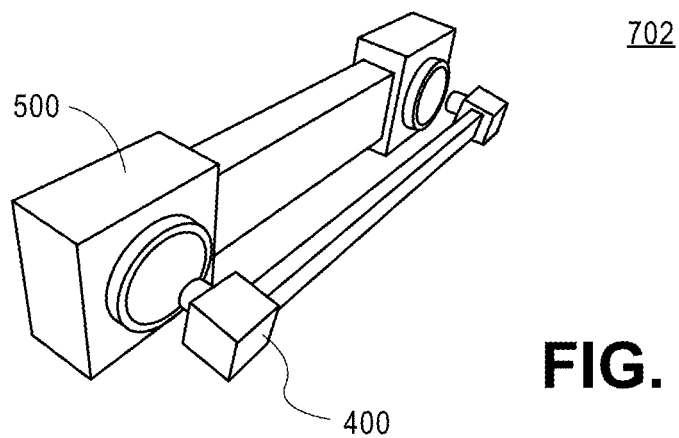
Figure 7C:
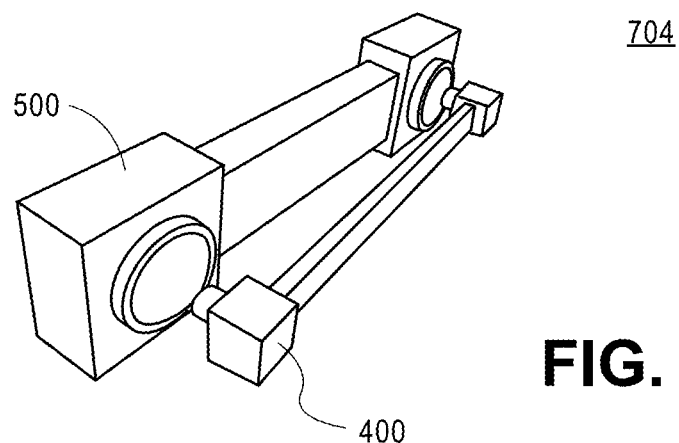

FIGS. 7A-7C illustrate the camera rig 400 and the DOE prop 500 at three different relative positions. A first image is captured by at least a first camera (or a first set of cameras) when the camera rig 400 and the DOE prop 500 are at a first position 700 relative to each other (as illustrated in FIG. 7A). A second image is captured by at least the first camera (or the first set of cameras) when the camera rig 400 and the DOE prop 500 are at a second position 702 relative to each other (as illustrated in FIG. 7B). A third image is captured by at least the first camera (or the first set of cameras) when the camera rig 400 and the DOE prop 500 are at a third position 704 relative to each other (as illustrated in FIG. 7C). The first position 700, the second position 702 and the third position 704 are all different from each other. The same process is concurrent for other cameras attached to the camera rig (e.g. the second camera attached to the camera rig 400).

As used herein, $_{c1}T_{p1}^{1}$ represents the rigid transform from the first DOE (e.g. p1) to the first camera (e.g. c1), when the camera rig 400 and the DOE prop 500 are at the first position 702 relative to each other (e.g. pose number 1). The relative position of the camera rig 400 with respect to the DOE prop 500 may change from the first position 702 to the second position 704 in such a way that the camera rig 400 still fits the DOE prop 500 (e.g. the cameras are provided within the eye boxes of the DOEs), and that the motion (e.g. the change in the relative motion) includes a first rotation. The relative position of the camera rig 400 with respect to the DOE prop 500 may change from the second position 702 to the third position 704 in such a way that the camera rig 400 still fits the DOE prop 500 (e.g. the cameras are provided within the eye boxes of the DOEs), and that the motion (e.g. the change in the relative motion) includes a second rotation. The axis of rotation of the second rotation is different than the axis of rotation of the first rotation.

In some embodiments, the position of the camera rig with respect to the DOE prop may be manually adjusted. Alternatively, the position of the camera rig with respect to the DOE prop may be adjusted using a computing or robotic system (e.g. the image processing server computer 600). For example, the processor of the image processing server computer 600 may generate signals to control the position of the cameras coupled to the camera rig and/or the camera rig, and send the signals to the camera rig via wired or wireless connection 602.

Figure 8:
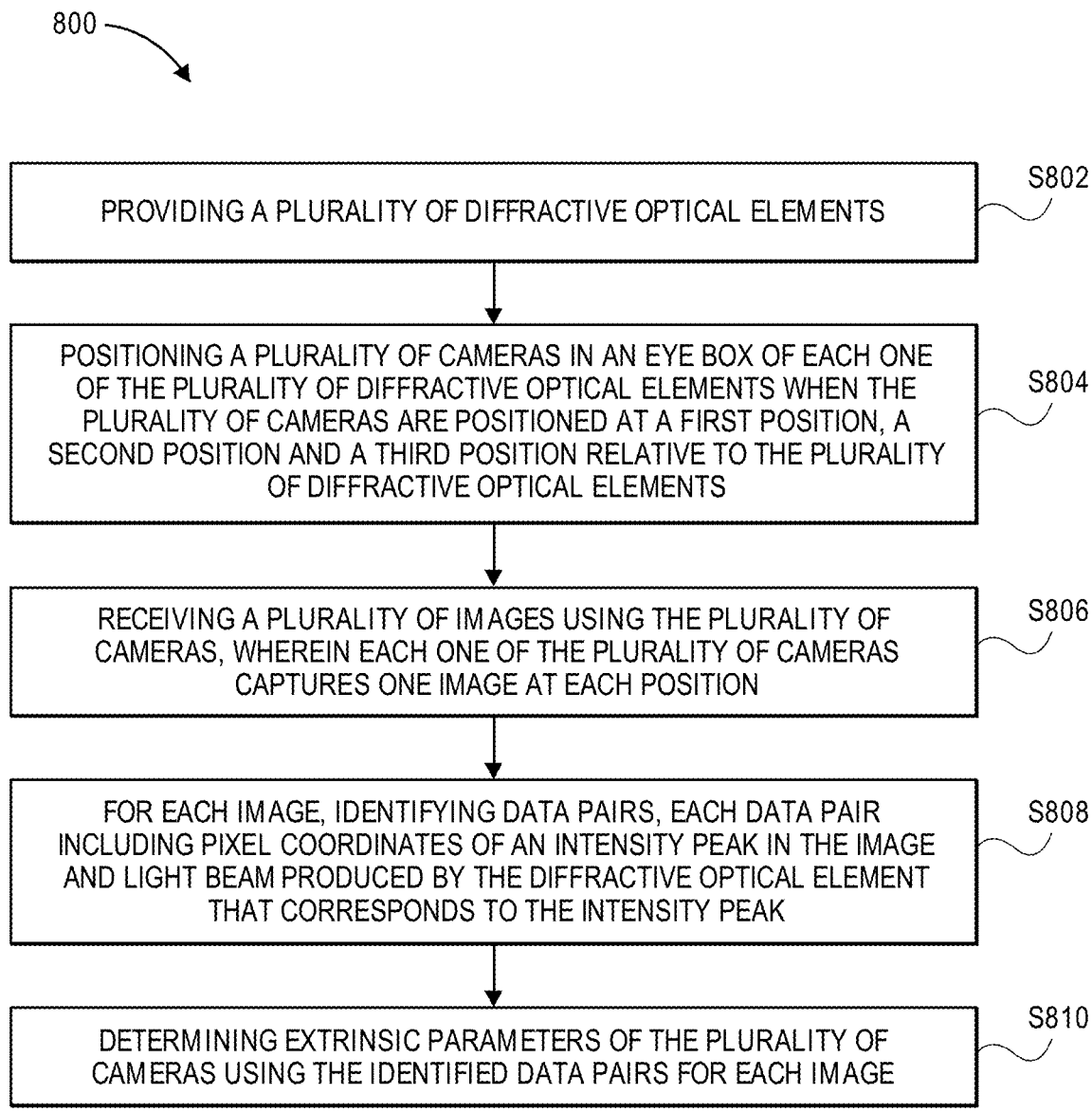
FIG. 8 is a simplified flowchart illustrating a method for determining extrinsic parameters of a plurality of cameras according to some embodiments of the present invention.

An exemplary method 800 for extrinsically calibrating the camera rig and the DOE prop (e.g. simultaneously or concurrently determining the extrinsic parameters of the DOE prop and the camera rig) is illustrated in FIG. 8. At step S802, a plurality of DOEs are provided on a DOE prop, similar to the DOE prop 500 illustrated in FIG. 5. According to the exemplary embodiment discussed next, the DOEs may be finite-distance DOEs, for illustrative purposes. At step S804, a camera rig including a plurality of camera such as the camera rig 400 illustrated in FIG. 4, is positioned in front of the DOE prop such that each camera is placed within an eye box of a respective DOE (similar to the configuration illustrated in FIG. 6).

When the camera rig and the DOE prop are at the first position relative to each other (e.g. pose number 1), the DOEs are activated such that each DOE generates a pattern of beams from input light. Each camera captures at least one image from its respective DOE in its respective eyebox at the first position. According to some embodiments, a plurality of images may be captured at the first position resulting in a set of images $I^{1,1}, \ldots, I^{K,1}$, where $I^{k,1}$ is the image captured by the $k^{th}$ camera at position number 1. Any given camera among the plurality of cameras captures a single image while the camera is at any one of the first position, the second position and the third position, such that each camera captures at least three images (i.e. one image at each one of the first position, the second position, and the third position.)

At step S806, the set of images is received at an image processing server. At step S808, the image processing server identifies pixel coordinates of intensity peaks in each image, resulting in K sets of detected pixel coordinates of intensity peaks $\{_pU^{1,1}_1, \ldots, _pU^{1,1}_N\}, \ldots \{_pU^{K,1}_1, \ldots, _pU^{K,1}_N\}$. Even though the same size N is used for each set, the invention is not limited to the exemplary embodiment and that each set may have different sizes $N_1, \ldots, N_K$.

At step S810, the image processing server 600 identifies correspondences between identified pixel coordinates of intensity peaks and lights created by the DOE. In essence, the image processing server identifies data pairs where each data pair contains the pixel coordinates of an intensity peak and corresponding light created by the DOE that forms the intensity peak on the image. As a result, the images processing server obtains K lists of data pairs at each position. The data pairs may be represented as $\{(_pU^{1,1}_1, _DA^{1,1}_1), (_pU^{1,1}_2, _DA^{1,1}_2), \ldots, (_pU^{1,1}_N, _DA^{1,1}_N)\}, \ldots,$
$\{(_pU^{K,1}_1, _DA^{K,1}_1), (_pU^{K,1}_2, _DA^{K,1}_2), \ldots, (_pU^{K,1}_N, _DA^{K,1}_N)\}$
at the first position,
$\{(_pU^{1,2}_1, _DA^{1,2}_1), (_pU^{1,2}_2, _DA^{1,2}_2), \ldots, (_pU^{1,2}_N, _DA^{1,2}_N)\}, \ldots,$
$\{(_pU^{K,2}_1, _DA^{K,2}_1), (_pU^{K,2}_2, _DA^{K,2}_2), \ldots, (_pU^{K,2}_N, _DA^{K,2}_N)\}$
at the second position, and
$\{(_pU^{1,3}_1, _DA^{1,3}_1), (_pU^{1,3}_2, _DA^{1,3}_2), \ldots, (_pU^{1,3}_N, _DA^{1,3}_N)\}, \ldots,$
$\{(_pU^{K,3}_1, _DA^{K,3}_1), (_pU^{K,3}_2, _DA^{K,3}_2), \ldots, (_pU^{K,3}_N, _DA^{K,3}_N)\}$
at the third position, where the $_pU^{k,1}_i$ represent the pixel coordinates of intensity peaks in the image, and $_DA^k_i$ represent the corresponding directions of the lights, in DOE-centric coordinates.

At step S810, the image processing server determines the extrinsic parameters of the cameras (e.g. $_{ck}T_{c1}$) and the extrinsic parameters of the DOEs (e.g. $_{p1}T_{pk}$) using the identified data. That is, the image processing server 600 determines (e.g. calculates) the rigid transforms $\widetilde{_{c1}T_{p1}^1}$, $\widetilde{_{c1}T_{p1}^2}$, $\widetilde{_{c1}T_{p1}^3}$, the K−1 transforms $\widetilde{_{ck}T_{c1}}$ and the K−1 transforms $\widetilde{_{p1}T_{pk}}$ that minimize $$Q(_{c1}T_{p1}^1, _{c1}T_{p1}^2, _{c1}T_{p1}^3, _{c2}T_{c1}, \ldots, _{ck}T_{c1}, _{p1}T_{p2}, \ldots, _{p1}T_{pk}) = \Sigma_{l=1}^3 \Sigma_{k=1}^K \Sigma_{i=1}^N \| _pU^{k,l}_i - f(_{ck}T_{c1} \cdot _{c1}T_{p1}^l \cdot _{p1}T_{pk} \cdot _DA^{k,1}_i) \|^2.$$

The identified transform $_{p1}T_{pk}$ (e.g. the extrinsic parameters) of the DOEs map a coordinate system of a given DOE to coordinate systems of other DOEs. The identified transform $_{ck}T_{c1}$ (e.g. the extrinsic parameters) of the plurality of cameras map a coordinate system of a given camera to coordinate systems of other cameras. In some embodiments, sensors other than cameras may be coupled to the camera rig 400. In such embodiments, the identified transform $_{ck}T_{c1}$ (e.g. the extrinsic parameters) of the plurality of cameras map a coordinate system of a given camera to coordinate systems of other sensors.

Determining the Extrinsic Parameters of the DOEs, the Extrinsic Parameters of the Cameras and the Intrinsic Parameters of the Cameras According to various embodiments, the image processing server 600 may further determine the intrinsic parameters of the cameras simultaneously or concurrently with (or prior to) determining the extrinsic parameters of the cameras and the extrinsic parameters of the DOEs. The intrinsic parameters of a given camera (e.g. $\widetilde{\Theta_k}$) include focal length, principal point and distortion coefficient(s) of the camera.

In some embodiments, the image processing server 600 may further determine the intrinsic parameters of the cameras (e.g. $\widetilde{\Theta_k}$) by modifying step S810 to determine (e.g. calculate) the rigid transforms $\widetilde{_cT_p}$, the K−1 transforms $\widetilde{_{ck}T_{c1}}$, the K−1 transforms $\widetilde{_{p1}T_{pk}}$ and the K camera intrinsic parameters $\widetilde{\Theta_k}$ that minimize $$Q(_{c1}T_{p1}^1, _{c1}T_{p1}^2, _{c1}T_{p1}^3, _{c2}T_{c1}, \ldots, _{ck}T_{c1}, _{p1}T_{p2}, \ldots, _{p1}T_{pk}, \Theta_1, \ldots, \Theta_K) = \Sigma_{l=1}^3 \Sigma_{k=1}^K \Sigma_{i=1}^N \| _pU^{k,l}_i - f(_{ck}T_{c1} \cdot _{c1}T_{p1}^l \cdot _{p1}T_{pk} \cdot _DA^{k,1}_i) \|^2.$$

According to various embodiments, DOEs used in simultaneous extrinsic calibration of the cameras and the DOEs may be infinite-distance DOEs. Infinite-distance DOEs generate patterns of virtual light sources at infinity. Accordingly, the translation of cameras or DOEs relative to each other does not have an impact on the captured image. For such embodiments, only the rotation matrices between the DOEs, and only the rotation matrices between the cameras will be determined. The image processing server 600 determines (e.g. calculates) the rotations $\widetilde{_{c1}R_{p1}^1}$, $\widetilde{_{c1}R_{p1}^2}$, $\widetilde{_{c1}R_{p1}^3}$, the K−1 transforms $\widetilde{_{ck}R_{c1}}$ and the K−1 transforms $\widetilde{_{p1}R_{pk}}$ that minimize $$Q(_{c1}R_{p1}^1, _{c1}R_{p1}^2, _{c1}R_{p1}^3, _{c2}R_{c1}, \ldots, _{ck}R_{c1}, _{p1}R_{p2}, \ldots, _{p1}R_{pk}) = \Sigma_{l=1}^3 \Sigma_{k=1}^K \Sigma_{i=1}^N \| _pU^{k,l}_i - f(_{ck}R_{c1} \cdot _{c1}R_{p1}^l \cdot _{p1}R_{pk} \cdot _DA^{k,1}_i) \|^2.$$

According to various embodiments, DOEs used in simultaneous extrinsic calibration of the cameras, extrinsic calibration of the DOEs and intrinsic calibration of the cameras may be infinite-distance DOEs. Infinite-distance DOEs may be used for simultaneously or concurrently determining the extrinsic parameters of the DOEs, the extrinsic parameters of the cameras and the intrinsic parameters of the cameras. Infinite-distance DOEs generate patterns of virtual light sources at infinity. Accordingly, the translation of cameras or DOEs relative to each other does not have an impact on the captured image. In such embodiments, the image processing server 600 determines (e.g. calculates) the rotations $\widehat{_{c1}R_{p1}^1}$, $\widehat{_{c1}R_{p1}^2}$, $\widehat{_{c1}R_{p1}^3}$, the K−1 transforms $\widehat{_{ck}R_{c1}}$ and the K−1 transforms $\widehat{_{p1}R_{pk}}$ that minimize $$Q(_{c1}R_{p1}^1, _{c1}R_{p1}^2, _{c1}R_{p1}^3, _{c2}R_{c1}, \ldots, _{ck}R_{c1}, _{p1}R_{p2}, \ldots, _{p1}R_{pk}, \Theta_1, \ldots, \Theta_K) = \Sigma_{l=1}^{3} \Sigma_{i=1}^{K} \Sigma_{i=1}^{N} \|_p U^{k,l}_i - f(_{ck}R_{c1}, _{c1}R_{p1}^l, _{p1}R_{pk}, _DA^{k,l}_i, \Theta_k)\|^2.$$

Determining the Extrinsic Parameters of the Cameras Using Extrinsic-Calibrated DOEs Various embodiments of the present invention use previously extrinsically calibrated DOEs (e.g. the transforms $_{p1}T_{pk}$ are known or predetermined for all DOEs) to determine the extrinsic parameters of the cameras. To calibrate the extrinsic parameters of a K-camera camera rig using a calibrated K-DOE DOE prop, it is assumed that the cameras disposed upon the camera rig are positioned within the respective DOE eye boxes of the DOE prop, that the individual DOEs produce patterns of virtual light sources at a prescribed focal distance, and that the extrinsic calibration of the DOE prop is known (i.e. the transforms $_{p1}T_{pk}$ are known for all 2≤k≤K). In some embodiments, finite focal distance DOEs are used with translation and rotation transformation determination; in some embodiments, infinite focal distance DOEs can be used for rotational transformation determination.

Figure 9:
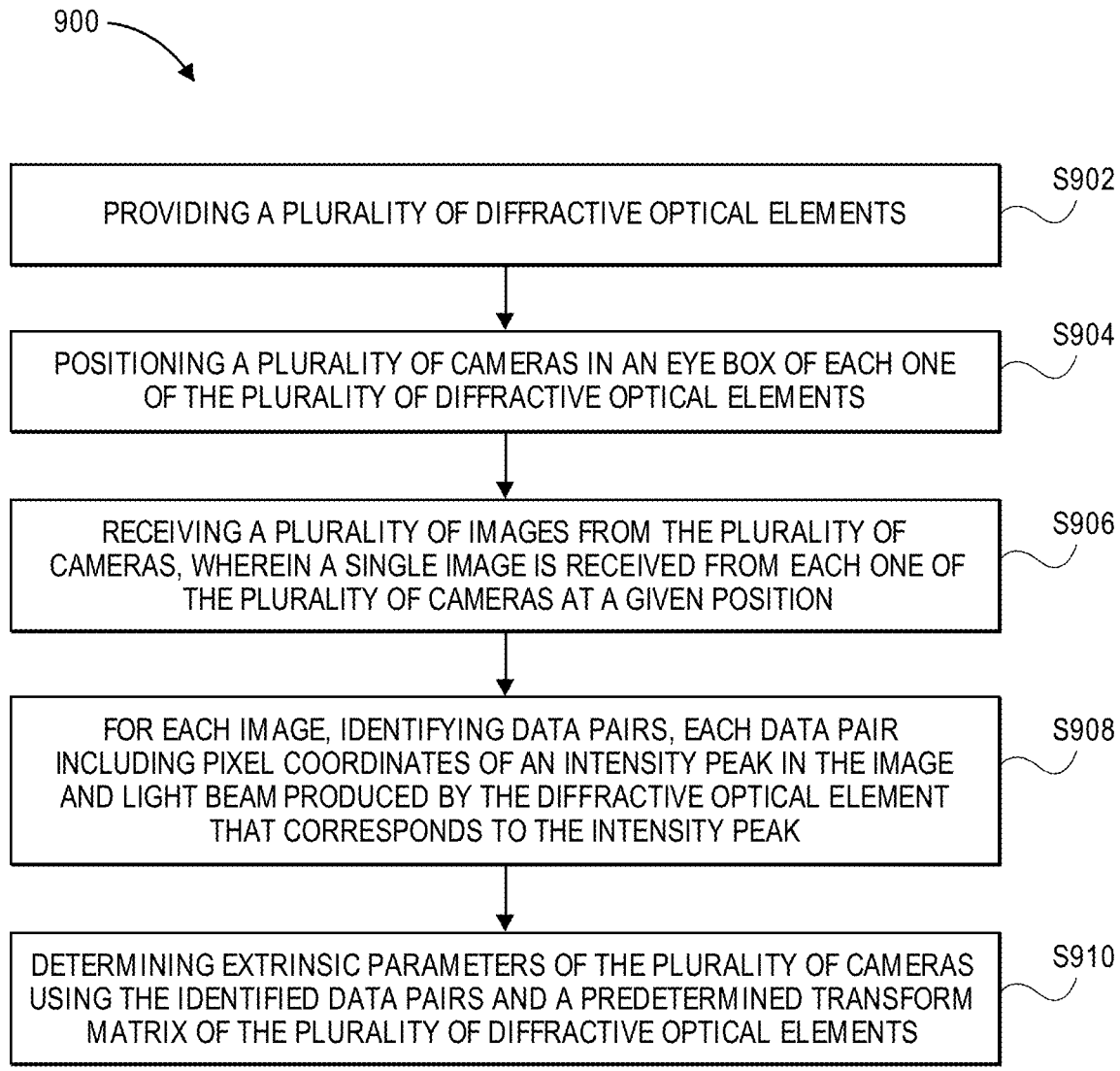
FIG. 9 is a simplified flowchart illustrating another method for determining extrinsic parameters of a plurality of cameras according to some embodiments of the present invention.

An exemplary method 900 for calibrating the extrinsic parameters of a camera rig is illustrated in FIG. 9. At step S902, a plurality of DOEs are provided on a DOE prop, similar to the DOE prop 500 illustrated in FIG. 5. According to the exemplary embodiment discussed next, the DOEs may be finite-distance DOEs. At step S904, a camera rig including a plurality of camera such as the camera rig 400 illustrated in FIG. 4, is positioned in front of the DOE prop such that each camera is placed within an eye box of a respective DOE (similar to the configuration illustrated in FIG. 6). The DOEs are turned on such that each DOE generates a predetermined pattern of beams of lights.

Each camera attached to the camera rig captures an image (e.g. a single image at a given position) resulting in a set of images $1^1, \ldots, 1^K$, where $1^k$ is the image captured by the $k^{th}$ camera. According to embodiments of the present invention, each camera captures a single image at a given position, thereby capturing a total of three images at three different positions. At step S906, the set of images is received at an image processing server. At step S908, the image processing server identifies pixel coordinates of intensity peaks in each image, resulting in K sets of detected pixel coordinates of intensity peaks $\{_pU^1_1, \ldots, _pU^1_N\}, \ldots \{_pU^K_1\}, \ldots, \{_pU^K_N\}$. Even though the same size N is used for each set, the invention is not limited to the exemplary embodiment and that each set may have different sizes $N_1, \ldots, N_K$.

At step S908, the image processing server 600 identifies correspondences between identified pixel coordinates of intensity peaks and lights created by the DOE. In essence, the image processing server identifies data pairs where each data pair contains the pixel coordinates of an intensity peak and corresponding light created by the DOE that forms the intensity peak on the image. As a result, the images processing server obtains K lists of data pairs $\{(_pU^1_1, _DA^1_1), (_pU^1_2, _DA^1_2), \ldots, (_pU^1_N, _DA^1_N)\}, \ldots,$
$\{(_pU^K_1, _DA^K_1), (_pU^K_2, _DA^K_2), \ldots, (_pU^K_N, _DA^K_N)\}$ where the $_pU^k_i$ represent the pixel coordinates of intensity peaks in the image, and $_DA^k_i$ represent the corresponding directions of the lights, in DOE-centric coordinates.

At step S910, the image processing server determines the extrinsic parameters of the cameras using the identified data pairs and a predetermined transform matrix (e.g. $_{p1}T_{pk}$) of the DOEs. That is, the image processing server 600 determines (e.g. calculates) the rigid transform $_{ck}\hat{T}_{pk}$ that minimizes (e.g. optimizes) the cost function $Q(_{ck}T_{pk}) = \Sigma_{i=1}^{N} \|_p U^k_i - f(_{ck}T_{pk}, _DA^k_i)\|^2$ for each 1≤k≤K. Then, the image processing server computes the transform $_{ck}\hat{T}_{c1}$ by using the known transform $_{p1}T_{pk}$ and the previously determined rigid transform $_{ck}\hat{T}_{pk}$ as follows:

$$_{ck}\hat{T}_{c1} = _{ck}\hat{T}_{pk} \cdot _{p1}T^{-1}_{pk} \cdot _{p1}\hat{T}_{c1}, \text{ for each } 2 \le k \le K.$$

According to various embodiments, DOEs used in extrinsic calibration of the cameras may be infinite-distance DOEs. Infinite-distance DOEs generate patterns of virtual light sources at infinity. Accordingly, the translation of cameras relative to each other does not have an impact on the captured image. For such embodiments, only the rotation matrices between the cameras $_{ck}R_{c1}$, for 1≤k≤K will be determined. Accordingly, the image processing server determines the extrinsic parameters (i.e. rotation matrices) of the cameras using the identified data pairs and a predetermined transform matrix (e.g. $_{p1}R_{pk}$) of the DOEs. That is, the image processing server 600 determines (e.g. calculates) the rotation $_{ck}\hat{R}_{pk}$ that minimizes $Q(_{ck}R_{pk}) = \Sigma_{i=1}^{N} \|_p U^k_i - f(_{ck}R_{pk}, _DA^k_i)\|^2$ for each 1≤k≤K. Then, the image processing server computes the transform $_{ck}\hat{R}_{c1}$ by using the known transform $_{p1}R_{pk}$ and the previously determined rigid transform $_{ck}\hat{R}_{pk}$ as follows:

$$_{ck}\hat{R}_{c1} = _{ck}\hat{R}_{pk} \cdot _{p1}R^{-1}_{pk} \cdot _{p1}\hat{R}_{c1}, \text{ for each } 2 \le k \le K.$$

Determining the Extrinsic Parameters of the DOEs Using Extrinsic-Calibrated Cameras Various embodiments of the present invention use previously extrinsically calibrated cameras (e.g. the transforms $_{c1}T_{ck}$ are known or predetermined for all cameras) to determine the extrinsic parameters of DOEs. For example, upon determining extrinsic parameters of the cameras, the DOEs coupled to the DOE prop may be replaced with different DOEs that are to be extrinsically calibrated.

The extrinsic parameters of a K-DOE DOE prop (e.g. a DOE prop having K number of DOEs) may be determined using an extrinsic-calibrated K-camera camera rig (e.g. a camera rig having K number of cameras). Since the camera rig is extrinsic-calibrated, the transform $_{c1}T_{ck}$ is known for all k in 1 … K and the transform $_{p1}T_{pk}$ will be determined. Accordingly, the image processing server determines the extrinsic parameters of the DOEs using the identified data pairs and the predetermined transform matrix (e.g. $_{c1}T_{ck}$) of the cameras. That is, the image processing server 600 determines (e.g. calculates) the transform matrix $_{ck}\hat{T}_{pk}$ that minimizes $Q(_{ck}T_{pk}) = \Sigma_{i=1}^{N} \|_p U^k_i - f(_{ck}T_{pk}, _DA^k_i)\|^2$ for each 1≤k≤K. Then, the image processing server computes the transform $_{pk}\hat{T}_{p1}$ by using the known transform $_{c1}T_{ck}$ and the previously determined rigid transform $_{ck}\hat{T}_{p1}$ as follows:

$$_{pk}\hat{T}_{p1} = _{ck}\hat{T}^{-1}_{pk} \cdot _{ck}T_{c1} \cdot _{c1}\hat{T}_{p1}, \text{ for each } 2 \le k \le K.$$

According to various embodiments, the number of lights generated by the DOEs may differ from one to another.

According to various embodiments, a method for determining extrinsic parameters of a plurality of cameras and extrinsic parameters of a plurality of finite-distance diffractive optical elements may include providing a plurality of rigidly connected intrinsically calibrated cameras (e.g. a camera rig) and a plurality of rigidly connected DOEs (e.g. a DOE prop), the DOEs being in the same number N as the cameras. The method may include positioning the camera rig and DOE prop in a first position such that each camera sees the pattern of one DOE such that camera number i sees the pattern of DOE, for i in 1 . . . N. The method may also include capturing one image by each camera, resulting in a collection of images $I_1, \ldots, I_N$, where image $I_i$ is produced by camera number i.

Subsequently, the method may further include positioning the camera rig and DOE prop in a second position such that each camera sees the pattern of the same DOE seen by the camera as described above (e.g. camera number i still sees the pattern of DOE, for i in 1 . . . N). The motion from the first position to the second position may include a non-trivial rotation. The method may proceed with capturing one image by each camera.

Subsequently, the method may include positioning the camera rig and DOE prop in a third position such that each camera sees the pattern of the same DOE seen by the camera as described above (e.g. camera number i still sees the pattern of DOE, for i in 1 . . . N). The motion from the first position to the second position may include a non-trivial rotation. The axis of the rotation from first position to second position may be different from the axis of the rotation from the first position to the third position. The method may proceed with capturing one image by each camera.

For each image captured for the first, second, and third position, a set of four or more correspondences between pixels and DOE lights may be determined. Using these correspondences, the method may include determining the extrinsic (e.g. rotation and translation) parameters of the cameras in the camera rig, as well as determining the extrinsic (e.g. rotation and translation) parameters of the diffractive elements in the DOE prop.

In some embodiments, the method described above may be performed using infinite-distance DOEs. In such embodiments, the only extrinsic parameters that are determined would include rotation parameters.

In some embodiments, the method described above may be performed using cameras that are not intrinsically calibrated. In such embodiments, the intrinsic parameters of the cameras are determined in addition to the extrinsic parameters of the cameras.

According to various embodiments, a method for determining extrinsic parameters of a plurality of cameras may include providing a plurality of rigidly connected cameras (e.g. camera rig), where the intrinsic parameters of the cameras are known (i.e. the cameras are intrinsically calibrated). The method may also include providing a plurality of rigidly connected finite-distance DOEs (e.g. DOE prop), the DOEs being in the same number N as the cameras, where the extrinsic parameters of the DOE prop is known (i.e. the DOE prop is extrinsically calibrated). The method may include positioning the camera rig such that each camera sees the pattern of one DOE, (e.g. camera number i sees the pattern of DOE, for i in 1 . . . N. The method may include capturing one image by each camera, resulting in a collection of images $I_1, \ldots, I_N$, where image $I_i$ is produced by camera number i. For each captured image, a set of four or more correspondences between pixels and DOE lights are computed. From these correspondences, the extrinsic (e.g. rotation and translation) parameters of the cameras in the camera rig are computed.

In some embodiments, the method described above may be performed using infinite-distance DOEs. In such embodiments, the only extrinsic parameters of the cameras in the camera rig that are determined would include rotation parameters.

In some embodiments, the method described above may be performed using cameras that are not intrinsically calibrated (i.e. without knowledge of the camera intrinsic parameters). In such embodiments, the intrinsic parameters of the cameras are determined in addition to the extrinsic parameters of the cameras.

According to various embodiments, a method for determining extrinsic parameters of a plurality of DOEs may include providing a plurality of rigidly connected cameras (e.g. a camera rig) where the intrinsic parameters of the cameras are known (i.e. the cameras are intrinsically calibrated), and the extrinsic (i.e. rotation and translation) parameters of the cameras are known (i.e. the cameras are extrinsically calibrated). The method may also include providing a plurality of rigidly connected finite-distance DOEs (e.g. a DOE prop), the DOEs being in the same number N as the cameras. The method may include positioning the camera rig such that each camera sees the pattern of one DOE, (camera number i sees the pattern of DOE, for i in 1 . . . N). The method may also include capturing one image by each camera, resulting in a collection of images $I_1, \ldots, I_N$, where image $I_i$ is produced by camera number i. For each captured image, a set of four or more correspondences between pixels and DOE lights may be computed. From the correspondences, the extrinsic (e.g. rotation and translation) parameters of the DOEs in the DOE prop may be computed.

In some embodiments, the method described above may be performed using infinite-distance DOEs. In such embodiments, the only extrinsic parameters of the DOEs in the DOE prop that are determined would include rotation parameters.

Embodiments provide a number of advantages over prior systems. Embodiments allow for simultaneous extrinsic calibration of multiple cameras and multiple DOEs, as well as intrinsic calibration of the cameras. All extrinsic and intrinsic parameters may be determined by having each camera to capture a single image at a given position. Thus, embodiments of the present invention achieve simultaneous calibration using fewer images than conventional systems.

Any of the computer systems (e.g. image processing server computer) mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components.

A computer system can include a plurality of the same components or subsystems, e.g., connected together by an external interface. In some embodiments, computer systems, subsystem, or apparatuses can communicate over a network. In such instances, one computer can be considered a client and another computer a server. A client and a server can each include multiple systems, subsystems, or components, mentioned herein.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A system for determining extrinsic parameters of a plurality of cameras, the system comprising:
    a plurality of diffractive optical elements;
    a plurality of cameras configured to remain in an eye box of each one of the plurality of diffractive optical elements when the plurality of cameras are positioned at a first position, a second position and a third position relative to the plurality of diffractive optical elements; and
    a processor coupled to the plurality of cameras to receive image data from the plurality of cameras, wherein the processor stores executable instructions that, when executed by the processor, cause the processor to:
        at each one of the first position, the second position and the third position:
            receive a plurality of images from the plurality of cameras, wherein each one of the plurality of cameras takes at least one image when positioned at each one of the first position, the second position and the third position;
            for each image, identify data pairs, each data pair including pixel coordinates of an intensity peak in the image and virtual light source produced by the diffractive optical element that corresponds to the intensity peak;
            determine extrinsic parameters of the plurality of cameras using the identified data pairs for each image;
        determine extrinsic parameters of the plurality of diffractive optical elements using the identified data pairs for each image at each one of the first position, the second position and the third position, wherein the extrinsic parameters of the plurality of diffractive optical elements map a coordinate system of a given diffractive optical element of the plurality of diffractive optical elements to coordinate systems of other diffractive optical elements of the plurality of diffractive optical elements.

2. The system of claim 1, wherein the extrinsic parameters of the plurality of diffractive optical elements is determined concurrently with the extrinsic parameters of the plurality of cameras.

3. The system of claim 1, wherein the processor stores executable instructions that, when executed by the processor, cause the processor to:
    determine intrinsic parameters of the plurality of cameras simultaneously or concurrently with determining the extrinsic parameters of the plurality of cameras, wherein the intrinsic parameters include one or more of a focal length, a principal point and distortion coefficient(s) of a camera.

4. The system of claim 1, wherein the extrinsic parameters of the plurality of cameras map a coordinate system of a given camera of the plurality of cameras to coordinate systems of other cameras of the plurality of cameras.

5. The system of claim 1, wherein the extrinsic parameters of the plurality of cameras map a coordinate system of a given camera of the plurality of cameras to coordinate systems of a plurality of sensors.

6. The system of claim 1, wherein the plurality of cameras are coupled to a first support system including at least one support beam.

7. The system of claim 6, wherein the plurality of cameras are coupled two at a time to the first support system, and the plurality of diffractive optical elements include two diffractive optical elements coupled to a second support system including at least one support beam.

8. The system of claim 1, wherein the plurality of diffractive optical elements are coupled to a support system including at least one support beam.

9. The system of claim 1, wherein the processor stores executable instructions that, when executed by the processor, cause the processor to:
    position a camera among the plurality of cameras at one of the first position, the second position or the third position.

10. A method for determining extrinsic parameters of a plurality of cameras, the method comprising:

(a) providing a plurality of diffractive optical elements, (b) providing a plurality of cameras positioned in an eye box of each one of the plurality of diffractive optical elements when the plurality of cameras are positioned at a first position, a second position and a third position relative to the plurality of diffractive optical elements;

at each one of the first position, the second position and the third position:

(c) receiving a plurality of images from the plurality of cameras, wherein each one of the plurality of cameras takes at least one image when positioned at each one of the first position, the second position and the third position;

(d) for each image, identifying data pairs, each data pair including pixel coordinates of an intensity peak in the image and virtual light source produced by the diffractive optical element that corresponds to the intensity peak;

(e) determining extrinsic parameters of the plurality of cameras using the identified data pairs for each image, and (f) determining extrinsic parameters of the plurality of diffractive optical elements using the identified data pairs for each image at each one of the first position, the second position and the third position, wherein the extrinsic parameters of the plurality of diffractive optical elements map a coordinate system of a given diffractive optical element of the plurality of diffractive optical elements to coordinate systems of other diffractive optical elements of the plurality of diffractive optical elements.

11. The method of claim 10, wherein the extrinsic parameters of the plurality of diffractive optical elements is determined simultaneously or concurrently with the extrinsic parameters of the plurality of cameras.

12. The method of claim 10, further comprising:

determining intrinsic parameters of the plurality of cameras simultaneously or concurrently with determining the extrinsic parameters of the plurality of cameras, wherein the intrinsic parameters include one or more of a focal length, a principal point and distortion coefficient(s) of a camera.

13. The method of claim 10, wherein the extrinsic parameters of the plurality of cameras map a coordinate system of a given camera of the plurality of cameras to coordinate systems other cameras of the plurality of cameras.

14. The method of claim 10, wherein the plurality of cameras are coupled two at a time to a first support system at least one support beam, and the plurality of diffractive optical elements include two diffractive optical elements coupled to a second support system including at least one support beam.

15. The method of claim 10, wherein the extrinsic parameters of the plurality of cameras map a coordinate system of a given camera of the plurality of cameras to coordinate systems of a plurality of sensors.

16. The method of claim 10, further comprising:

positioning a camera among the plurality of cameras at one of the first position, the second position or the third position.

17. A method of determining extrinsic parameters of a plurality of cameras using a plurality of diffractive optical elements, the method comprising:

providing a plurality of diffractive optical elements;

providing a plurality of cameras positioned in an eye box of each one of the plurality of diffractive optical elements;

receiving a plurality of images from the plurality of cameras, wherein a single image is received from each one of the plurality of cameras at a given position with respect to one of the plurality of diffractive optical elements;

for each image, identifying data pairs, each data pair including pixel coordinates of an intensity peak in the image and virtual light source produced by the diffractive optical element that corresponds to the intensity peak;

determining extrinsic parameters of the plurality of cameras using the identified data pairs and a predetermined transform matrix of the plurality of diffractive optical elements;

upon determining extrinsic parameters of the plurality of cameras, replacing the plurality of diffractive optical elements with different diffractive optical elements; and determining extrinsic parameters of the different diffractive optical elements using the extrinsic parameters of the plurality of cameras, wherein the extrinsic parameters of the different of diffractive optical elements map a coordinate system of a given diffractive optical element of the different diffractive optical elements to coordinate systems of other diffractive optical elements of the different diffractive optical elements.

18. The method of claim 17, further comprising:

determining a cost function including a sum of at least a subset of the data pairs; and optimizing the cost function to determine a first transformation matrix for each one of the plurality of cameras, wherein the first transformation matrix maps a coordinate system of a given camera to a coordinate system of a corresponding diffractive optical element, wherein the extrinsic parameters are determined using the first transformation matrix.

19. The method of claim 17, wherein the extrinsic parameters of one of the plurality of cameras includes a second transformation matrix that maps a coordinate system of the one of the plurality of cameras to a coordinate system of another one of the plurality of cameras.

20. The method of claim 17, wherein the diffractive optical elements are infinite distance diffractive optical elements, and wherein the extrinsic parameters of one of the plurality of cameras includes a rotation matrix that maps a rotation in a coordinate system of the one of the plurality of cameras to a coordinate system of another one of the plurality of cameras.

21. The method of claim 17, further comprising:

determining intrinsic parameters of the plurality of cameras simultaneously or concurrently with determining the extrinsic parameters of the plurality of cameras, wherein the intrinsic parameters include one or more of a focal length, a principal point and distortion coefficient(s) of a camera.

22. A system for determining extrinsic parameters of a plurality of cameras using a plurality of diffractive optical elements, the system comprising:
- a plurality of diffractive optical elements;
- a plurality of cameras configured to remain in an eye box of each one of the plurality of diffractive optical elements; and
- a processor coupled to the plurality of cameras, wherein the processor stores executable instructions that, when executed by the processor, cause the processor to:
  - receive a plurality of images from the plurality of cameras, wherein a single image is received from each one of the plurality of cameras at a given position with respect to one of the plurality of diffractive optical elements;
  - for each image, identify data pairs, each data pair including pixel coordinates of an intensity peak in the image and virtual light source produced by the diffractive optical element that corresponds to the intensity peak;
  - determine extrinsic parameters of the plurality of cameras using the identified data pairs and a predetermined transform matrix of the plurality of diffractive optical elements;
  - upon determining extrinsic parameters of the plurality of cameras,
  - replace the plurality of diffractive optical elements with different diffractive optical elements; and
  - determine extrinsic parameters of the different diffractive optical elements using the extrinsic parameters of the plurality of cameras, wherein the extrinsic parameters of the different of diffractive optical elements map a coordinate system of a given diffractive optical element of the different diffractive optical elements to coordinate systems of other diffractive optical elements of the different diffractive optical elements.

23. The system of claim 22, wherein the executable instructions, when executed by the processor, further cause the processor to:
- determine a cost function including a sum of at least a subset of the data pairs; and
- optimize the cost function to determine a first transformation matrix for each one of the plurality of cameras, wherein the first transformation matrix maps a coordinate system of a given camera to a coordinate system of a corresponding diffractive optical element, wherein the extrinsic parameters are determined using the first transformation matrix.

24. The system of claim 22, wherein the extrinsic parameters of one of the plurality of cameras includes a second transformation matrix that maps a coordinate system of the one of the plurality of cameras to a coordinate system of another one of the plurality of cameras.

25. The system of claim 22, wherein the diffractive optical elements are infinite distance diffractive optical elements, and wherein the extrinsic parameters of one of the plurality of cameras includes a rotation matrix that maps a rotation in a coordinate system of the one of the plurality of cameras to a coordinate system of another one of the plurality of cameras.

26. The system of claim 22, wherein the executable instructions, when executed by the processor, further cause the processor to:
- determine intrinsic parameters of the plurality of cameras simultaneously or concurrently with determining the extrinsic parameters of the plurality of cameras, wherein the intrinsic parameters include one or more of a focal length, a principal point and distortion coefficient(s) of a camera.

* * * * *